2,636,924

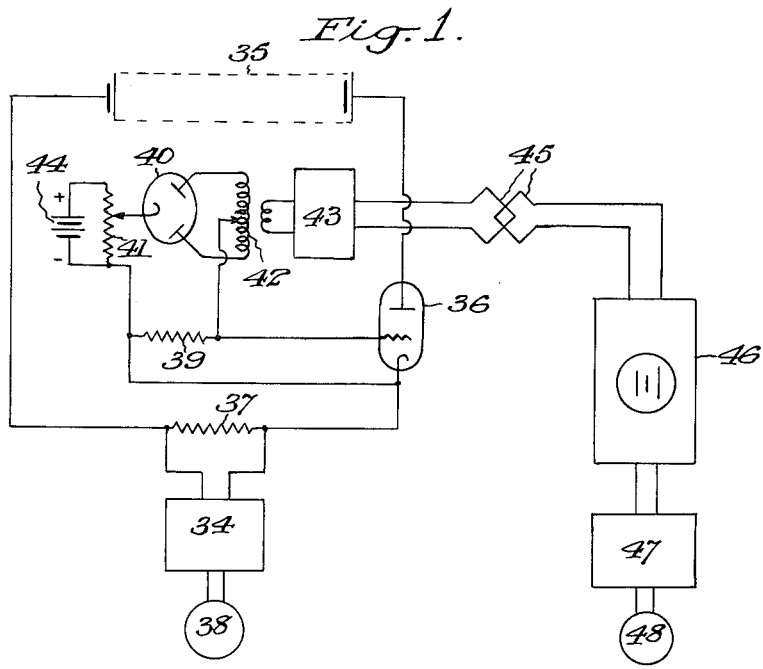
Fig. 1.
 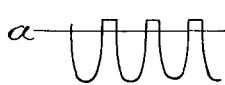 
Fig. 1a.    Fig. 1b.    Fig. 1c.
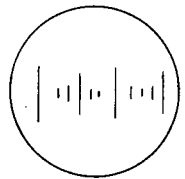 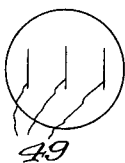 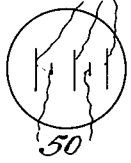 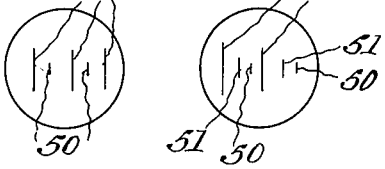
Fig. 2.    Fig. 2a.    Fig. 2b.    Fig. 2c.
INVENTORS
Hans T. F. Lundberg
Theodore Zuschlag
BY
Their attorneys Patented Apr. 28, 1953

UNITED STATES PATENT OFFICE 2,636,924

METHOD OF GEOPHYSICAL EXPLORATION

Hans T. F. Lundberg, Toronto, Ontario, Canada, and Theodore Zuschlag, West Englewood, N. J., assignors, by mesne assignments, to Lundberg Explorations Limited, Toronto, Ontario, Canada, a corporation of Ontario Application November 1, 1944, Serial No. 561,436

2 Claims. (Cl. 175—182)

This invention relates to apparatus for and method of geophysical exploration, and has for an object to provide means and procedures which are adapted to the obtaining of accurate and very complete information or data concerning geologic structures, sub-surface mineral deposits etc., while the instruments used in the exploration and the operator are in motion. The invention is susceptible of utilization during transportation of the instruments and operator along the surface of the earth by humans, animals, vehicles, or any other suitable form of transportation, as well as during surface or sub-surface transportation, at different depths, on or through water, as by float, vessel or submarine; but it is of particular utility and advantage in the case of transportation through the air, as by heavier or lighter than air powered craft. Certain of the measurements or investigations may also effectively be made from ballons, kites or the like, particularly with respect to obtaining data with the instruments at different heights above the earth's surface. While the invention is thus broadly applicable, we believe, however, that its greatest utility and advantage lie in its availability for use while the instruments and operator are being transported by airplane and, especially, by airplane of the helicopter type.

Another object consists in providing means and method whereby the transportation of the instruments and operator in repeated trips over an area under investigation, and at different heights above said area, enables the recording of information and data which, through known and approved procedure, can be translated into a disclosure of the approximate location, outline, mass, and depth beneath the earth's surface of a sought for deposit.

Another object consists in providing means and method whereby the exploration may be accomplished by either an electric procedure or a magnetic procedure, or an electromagnetic procedure.

Another object consists in providing means and method whereby areas of the earth's surface which are either large, and/or difficultly traversible, and/or covered by water, may be investigated as to valuable deposits lying therebeneath in a convenient, expeditious, and efficient manner; while the specific portions of the said area indicated as including sought for deposits may be outlined for subsequent drilling or the like by the dropping of suitable markers such, for instance, as splashes of paint or poles with flags thereon or buoys; and/or by photographing the terrain.

Another object consists in providing means and method whereby the instruments and operator may be transported in repeated courses over the area under investigation at one height above the earth's surface; then transported in repeated courses at another height or heights; and also transported vertically in one or more courses, as well as remaining stationary for a desired period or periods in different horizontal and vertical locations.

Another object consists in providing means and method which include the employment of ultra high frequency electric impulses.

Another object consists in providing means and method which include the employment of ultra high frequency electric impulses projected as beams, and the recording of effects upon said beams caused by their contact with anomalies in the earth.

Another object consists in providing means and method whereby advantage may be taken of the characteristics and capacities of electronic devices.

Another object consists in providing means and method whereby advantage may be taken of the characteristics and capacities of electronic devices capable of beaming into the earth short cyclic impulses of high intensity ultra high frequency waves.

Another object consists in providing means and method whereby advantage may be taken of the characteristics and capacities of electronic devices capable of beaming into the earth short cyclic impulses of high intensity ultra high frequency waves, together with a cathode ray indicator, or the like, capable of receiving and denoting effects upon the reflection, refraction and distortion of said waves caused by anomalies in the area of the earth under investigation.

Another object consists in providing means and method whereby advantage may be taken of the characteristics and capacities of a novel electronic device and cathode ray indicator, resulting in the greatly improved use of ultra high frequency waves and the recording of said waves as reflected, refracted or distorted by significant anomalies in the earth.

Another object consists in providing means and method whereby all the above mentioned devices acquire increased sensitivity and reliability with respect to slight variations in the fields or media under investigaton.

Another object consists in providing certain changes and improvements in the form, construction, material and arangement of the means or apparatus, and in the kind, character and order of steps taken in the method, whereby the above named and other objects inherent in this invention may effectively be attained.

Practical embodiments of certain forms of apparatus embodying features of this invention and useful in carrying out the method of this invention are diagrammatically shown in the accompanying drawings, in which Fig. 1 represents an arrangement of electronic means for beaming ultra high frequency waves and recording the reflected, refracted or distorted waves;

Figs. 1a, 1b and 1c represent various forms of the high frequency waves as affected by the adjustment of the apparatus;

Fig. 2 represents a record of wave impulses of different amplitudes and different intervals; and Figs. 2a, 2b and 2c represent respectively the recording of waves projected in space; the recording of waves that have been affected by contact with a metallic substance or the like; and the recording of waves that have been affected by contact with a metallic substance or the like embedded in or combined with a substance of lesser conductivity.

The possibility of conducting geophysical exploration with the instruments mounted on moving supports has heretofore been envisaged and attempts in that direction have been reported, but, so far as we are aware, all such attempts have resulted unsatisfactorily largely because of inaccuracy in the measurements, readings, information, and data obtained, which inaccuracy has increased along with the speed of travel of the moving support for the instruments used in the operation.

We have discovered that previous disappointments have been due not only to the want of adequate instruments and the type and handling of the moving supports, but also, and largely, to the failure to foresee the need of and to provide suitable mountings for the instruments which call for gyroscopically controlled of stabilized devices, or the like, to obviate effects such, for instance, as the lurching or wavering of aircraft, and maintain the instruments in correct position with respect to level and horizontal and vertical direction. This discovery and provision therefor thus constitutes a valuable feature of our invention which is directed to overcoming previously existing difficulties or obstacles to success, as we contemplate mounting efficient instruments in even a fast flying airplane and yet securing not only accurate measurements, readings, information and data, but also more complete results in these respects than has heretofore been obtainable.

It will be clear that an airplane, or other form of aerial transportation, can be caused to pass in repeated courses above selected areas of the earth's surface in any direction desired and at substantially any height desired entirely unhampered by the character of the earth's surface being traversed; and, likewise, that this coverage of the selected area can be completed much more rapidly than if the transportation were taking place on the ground. Furthermore, aerial transportation, largely because of its flexibility, provides a means for determining the approximate length, width, thickness, outline and depth below the earth's surface of sought for deposits; thus providing, in effect, complete information sought by the investigation under way. Our invention enables these practical advantages, as well as others derivable from aerial transportation, to be obtained and utilized, without sacrificing accuracy in any respect. Indeed, we obtain significant indications with such rapidity and accuracy that the operator of the airplane, or the like, can direct its course so as to maintain it within the field of high intensity of significant indication and, by dropping suitable markers, physically outline on the ground the sought for deposit.

Our invention is adaptable to investigations through detector units within the influence of either natural or artificial fields of energy, and a suitable detector unit for conducting the investigation of magnetic fields may consist of an earth inductor compass transported over the area being surveyed as, for instance, by a helicopter airplane which, as already indicated, lends itself extremely well to cooperative use and effect with other features of our invention.

Such an inductor compass, as known to those skilled in the art, embodies one or more coils for rotation within the natural magnetic earth field, which coils are connected to a special type of commutator upon which is or are located one or more pairs of brushes constructed so as to be adjustable to different positions.

The compass can be properly mounted in the airplane in cooperative association with an appropriate indicating device such, for instance, as a galvanometer, while the plane is flown over the area under survey. If, now, the coils are arranged so as to cut either the vertical or the horizontal component of the earth's magnetic field, the brushes can be adjusted and set to a zero induction brush position. In case this position coincides with or corresponds to the course angle of the longitudinal axis of the traveling plane, as the pilot guides the latter by navigational use of the compass, the needle of the galvanometer connected with the brushes of the inductor compass will normally indicate a zero deflection; which indication will persist as long as the pilot of the plane maintains the same course angle, or as long as the support for the compass is maintained in the same position and direction, regardless of the actual course direction of the plane, as by means of a gyroscopically controlled leveling and directing device, provided there is no change in the magnetic structure of the underlying territory. If, however, such a change is encountered, a deflection of the galvanometer needle from its zero position may be expected, which deflection would be indicative of an anomaly in the lines of magnetic force local to the position of the plane, said anomaly denoting the existence at this point of a geophysical condition suggesting the presence of a sought for deposit. By means and procedure well known to those skilled in the art, an automatic record of such fluctuation of the galvanometer needle may be made as the flight of the plane continues.

By systematically repeating such a flight along different profiles over different sections of the area under investigation and/or along the same profile but at different heights, the operator will collect a multitude of significant data which he may interpret as to its geophysical meaning by approved steps or procedures that have been established in this art and need not be herein described. Such flights may, and frequently should be, supplemented by the positioning of the helicopter plane at different vertical heights over one or more specific points within the area being surveyed, and the recording of needle fluctuations at the different heights in order, particularly, to add to the information data respecting the distance of the deposit below the surface of the earth and the vertical thickness or extent of the deposit itself. This data may be interpreted by itself and in connection with the data previously mentioned by well known and appropriate procedures; the result of the whole survey enabling the operator to determine the existence, location, length, width, outline, depth beneath the earth's surface, and bodily thickness of the sought for deposit.

The principle of the means and method of explorational survey hereinabove described is not limited to the type of investigation based upon natural magnetic fields, but may also be employed in surveys based upon artificially created magnetic fields and other types of investigation such, for instance, as electric or electromagnetic, including the making of absolute, semi-absolute and ratio measurements. It will also be understood that, when circumstances so dictate, the operator may avail himself of suitable additional auxiliary means or devices for facilitating the procedure according to our invention and increasing its utility and accuracy such, for instance, as automatic leveling supports of various kinds from the simple cardan double pivot to artificial horizons in a highly developed form, e. g. automatic pilot.

While, as already indicated, the operator following out our invention may, and should, avail himself of various devices, instruments, and procedures, known to and at the call of those skilled in this art, we believe that our invention is the first to enable satisfactorily accurate and practical geophysical exploration while the operator and instruments are being transported by air flights; and we also believe that we are the first to suggest the use of the earth inductor compass and the helicopter plane in this connection.

Another important development or branch of our invention relates to the detection of minor variations in substantially uniform magnetic fields with the aid of an extremely sensitive and stable detecting mechanism which is not only of high utility when mounted on a stationary support but is also of particular availability when properly mounted on a moving, and even a rapidly moving, support.

This detecting or investigating mechanism may be defined as an alternating current-direct current permeability bridge similar to that described in United States patent to Theodor Zuschlag No. 1,896,737, dated February 7, 1933. This instrument or mechanism is based upon a magnetic effect set up in a Nichrome wire, or its equivalent, which is used as a core in a coil energized by an alternating current and simultaneously exposed to the effects of a direct current generated in a substantially uniform field being investigated. The coil, or coils if more than one are used, may be designed and arranged as part of a sensitive bridge circuit similar to the circuit disclosed in United States patent to Theodor Zuschlag No. 1,676,347, dated July 10, 1928, or in any one of the variable feedback oscillator arrangements disclosed in United States patents to Theodor Zuschlag No. 2,267,884, dated December 30, 1941, and Nos. 2,329,810, 2,329,811, and 2,329,812, dated September 21, 1943.

An instrument or detecting mechanism constructed along any one of the lines just mentioned may be used with a high speed indicating device such, for instance, as a cathode ray oscillograph; and, especially when employed in investigations conducted from a moving support such as our invention contemplates, the instrument or mechanism should embody a core material which is not only extremely sensitive to the slightest variation in strength of the substantially uniform magnetic field under investigation but which, additionally, resists change in its operative characteristics when exposed to effects such as mechanical vibrations, thermic variations, and barometric fluctuations.

It is furthermore a matter of importance that the said instrument or detecting mechanism be carried in such a way as to maintain its essential stable characteristic, and this calls for the mounting of the same on an artificially stabilized platform, or the like, such as is utilized in the gyroscopic compass which is known to the art and, therefore, needs no further description herein.

Such an instrument or mechanism, designed and arranged as hereinabove set forth, has the great advantage that it can be used for the simultaneous investigation of three magnetic field components at right angles to each other, such as two horizontal components and one vertical component, thus providing the most complete exploration, investigation, or detection of any unidirectional field subject to investigation by magnetic procedure. Furthermore, such an instrument or mechanism, embodying a highly permeable core and mounted on a gyroscopically stabilized support, is calculated to render possible the conducting of such magnetic measurements to the precision of a sensitivity of one gamma, or less, even though the instrument or mechanism is being transported on a rapidly moving support; whereby investigations conducted as hereinabove described may be carried out, e. g. from an airplane, such as a helicopter, with a high degree of celerity and efficiency.

We have furthermore discovered that an advance in this field, relating especially to sensitivity in observations, is obtainable through the use of a detector instrument consisting of or including one or more magnetrons, which are extremely sensitive in their capacity for recording magnetic intensity. It is possible, for instance, to use three magnetrons positioned at right angles to each other, so that each one detects variations in magnetic intensity along the axis of its cylindrical anode, thereby determining the intensity and direction of the magnetic field being investigated at any point by keeping the orientation of the airplane, or other moving support, fixed or known, or by using a gyroscopically supported navigation instrument. Through the observation of automatic and continuous recording of the magnetic intensity detected by the magnetrons, the movement of the aircraft can be controlled by the operator so that the instruments employed in the investigation are kept within a certain field of intensity generated by the anomaly consisting of or related to a sought for deposit, which latter can simultaneously be outlined from the air by dropping indicators such, for instance, as buckets of paint or sign posts, and/or by photographing the terrain.

When the operator has determined the point of highest intensity of the magnetic force generated by the anomaly, he can determine the vertical rate of change of intensity by moving the aircraft to different heights above the said point of highest intensity, and thus be able to determine the depth at which the sought for deposit is located below the earth's surface as well as the thickness or vertical extent of the deposit itself.

It will also be clear to those skilled in the art that many modifications and ramifications may be resorted to in the exploration procedure, as may seem to the operator in charge to be most suitable or valuable under the existing circumstances, while still employing the principles and essential characteristics of our apparatus or devices and methods of procedure.

Our invention also includes means and method for geophysical exploration of the electric type in which we make use of the transmission of ultra high frequency waves from a moving support such, for instance, as an airplane, and the detection and recording of the said waves as reflected, refracted, or distorted by various conducting bodies in the earth such, for instance, as ore bodies and/or salt water horizons.

It is known that high frequency waves have a very low penetration capacity in conducting media such, for instance, as the earth's surface and sub-surface strata, and that their penetration capacity decreases with respect to the same conductivity characteristics with increase in the frequency of the waves. However, some of the energy of the waves, though small, succeeds in actual penetration and may be detected and measured in such a way as to afford data of value in geophysical prospecting. We have found that, by using ultra high frequency waves, and concentrating them into a beam having a very high amount of energy, the said beam may be directed to the earth and there will always remain a sufficient amount of the electric energy, following the penetration of the beam into the earth, to be measured with suitably sensitive instruments. For instance, we propose to produce from a portable field transmitter a series of such energy releases by applying several hundred kilowatts of power for very short periods such as a few millionths of a second. Our receiving device for detecting and measuring the waves is made very sensitive, so that even a very small residuum of energy remaining in the beam which has been reflected, refracted or distorted by different conducting substances in the earth, such, for instance, as ore bodies or salt water horizons, can be picked up and recorded. The direction of the reflected, refracted or distorted beam, together with the intensity of the residuum of energy detected by the receiver, yield data as to the character and configuration of a sought for deposit which is more complete and informative than has been obtainable by apparatus and methods heretofore in use.

According to one manner of putting this invention into practical operation, an extremely short cyclic impulse of high intensity ultra high frequency is beamed into the earth and the resultant reflected, refracted and distorted waves are received and inspected by means of a cathode ray indicator; following which the derived cathode ray pattern is systematically analyzed and interpreted as to its geophysical meaning.

Turning now to description of a practical form of apparatus embodying our invention by which ultra high frequency waves may be utilized for this very advanced and efficient procedure in geophysical exploration, reference is had to Fig. 1 of the accompanying drawings in which an ultra high frequency oscillator denoted by 34 is energized from a direct current power source 35 such, for instance, as a battery or generator. This power source 35 is connected to the oscillator 34 in series with an electronically controlled triode 36, and with a bleeder resistance 37 which is shunted across the oscillator 34. Connected to the oscillator 34, is a resonator or wave guide 38 that is capable of projecting the ultra high frequency waves in any desired direction, preferably in the form of a compact, narrow beam.

The current flow through triode 36 is normally cut off by the negative control bias which is developed across a bias resistor 39 which is connected in series with a rectifier tube 40, a potentiometer 41, and the center of a plate transformer 42 which is supplied with energy by a suitable variable frequency source 43, such, for instance, as a standard high frequency oscillator or radio transmitter. The said potentiometer 41 is shunted across a bias battery 44 and is adapted to control the above named cutoff in the rectifier tube 40. The variable frequency source 43 is fitted to establish, through a coupling device 45, a related time base in an oscilloscope 46, which latter is provided with the usual means for making a graphic record of its indications and is connected to the output of a receiver 47 that is, in turn, tied to a suitable antenna 48.

The controlling action of triode 36 on the plate current supply to oscillator 34 is a function of the bias wave set up in resistor 39, and the shape of this wave, when the slider of potentiometer 41 is located at its lower or negative end, is that of a typical full wave rectifier, as illustrated in Fig. 1a. If now, the slider of potentiometer 41 be moved toward its upper or positive end, the resultant effect is to, so to speak, slice off the sharp points of the wave pattern represented in Fig. 1a and set up a wave form similar to that represented in Fig. 1b, and in Fig. 1c if the said movement of the slider be continued.

Except for very short periods the current flow through triode 36 is normally blocked, and, if the line $a$—$a$ of Figs. 1a, 1b, and 1c, be taken as corresponding to the cutoff bias of triode 36, the latter will be conducting current only during time periods represented by the peaks of the rectified waves which extend above said line $a$—$a$. On this basis, the wave form shown in Fig. 1a may be used to establish conduction for a time period or duration which is represented by the expression $$\frac{2k}{f}$$

where $k$ is a factor denoting the sharpness of the wave peak in terms of degrees per half cycle and $f$ is the frequency of the source 43 in megacycles. Any slicing away or broadening of the wave peak denotes an increase of $k$ or a lengthening of the impulse duration as illustrated, for instance, in Figs. 1b and 1c; while the frequency $f$, on the other hand, determines the interval between successive impulses. The following table graphically sets forth the values of $$\frac{2k}{f}$$

in seconds as a function of the frequency measured in cycles, while $k$ equals 1.8 degrees per half cycle or numerically .01;

| $f=$ | $.1 \times 10^6$ | $1.0 \times 10^6$ | $10. \times 10^6$ |
|---|---|---|---|
| $\frac{2k}{f}=$ | $.2 \times 10^{-6}$ | $.02 \times 10^{-6}$ | $.002 \times 10^{-6}$ |

This control of the current flow through triode 36 has two desirable effects. In the first place, the power source 35 needs only to have a limited capacity because its energy is supplied for a very short period, such as a fraction of a second, corresponding to the value of $k$. In the second place, the duration of each impulse is so short that it only begins to effect the possible wave propagation in space; with the result that the oscilloscope 46 will not show one or more single lines representing the effect of almost instantaneous transmission and reception, but will resolve the received signals into a spectrum or a series of successive impulses arriving with different amplitude and at different intervals, as illustrated in Fig. 2 of the accompanying drawings. These successively received signals, indicated by the lines in Fig. 2, represent parts of the original wave transmission impulses which have been delayed in direct transmission or by earth media of different conductivity and dielectric constant; or which have been irregularly reflected, refracted or distorted by the media.

Our invention makes deliberate use of these effects by producing a series of impulse spectra for the purpose of comparison and interpretation of the differences therebetween as to their geophysical meaning. To illustrate this last statement, let us assume that the resonator 38 is located so as to discharge the beams into space, in which case the spectrum received will include only lines such as those shown in Fig. 2a and marked 49 because no reflection, refraction or distortion has taken place; and the lines in the figure merely represent successive impulses or discharges visually recorded by the oscilloscope 46 in accordance with the timing of the transmitted impulses which are also impressed upon the oscilloscope through the action of the coupling device 45. If, now, it be further assumed that the location of the resonator 38 is so changed that the beams emanating therefrom travel to the earth and contact a metallic substance, small fractions of the original ultra high frequency impulses will be reflected back into the receiver 47 and record small lines located at some point between each two of the larger lines, as indicated in Fig. 2b, where the short lines are denoted by 50. In this case, the spacing between the long lines 49 and short lines 50 is a measure of the time required for the discharged impulse to reach the metallic substance and be reflected back to the receiver; while the length of the lines 50 would be a measure of the intensity of the reflection and, consequently, of the size of the metallic substance. The amplitude or strength of the short lines 50 cannot be definitely varied by adjustment of the resonator 38, but the spacing of the said short lines can, theoretically at least, be varied to a substantial extent by adjusting the frequency source 43.

If it be assumed that the metallic substance is embedded in a medium of lesser conductivity such, for instance, as water, it can then be expected that most of the energy of the beam entering the water will be absorbed or reflected directly and that only minute fractions of it may reach the metallic object and still smaller fractions be reflected thereby. However, when the last named reflection occurs, the spectrum depicted by the oscilloscope 46 will take a form such as that shown in Fig. 2c where the long lines 49 again represent the direct transmission effects, the medium lines 51 represent the water reflection, and the short lines 50 represent the reflection from the metallic substance, especially if the water medium be of considerable depth. In view of the foregoing explanation, it may be stated that, if our combination transmitter-receiver be carried over the water, as by means of a plane, and the ultra high frequency wave beam be directed vertically toward the earth, the oscilloscope 46 will normally show only a two line picture, such as represented in Fig. 2b, while the sudden appearance of a third line, as in Fig. 2c, would be indicative of an object having a conductivity differing from that of the water; and similar conditions would hold true with respect to geophysical work.

Thus, if this instrument be carried over an area of the earth's surface which is fairly uniform from a geological point of view, a picture of the type shown in Fig. 2 would appear and persist until the character of the sub-surface changed to such an extent as to cause a change in the said picture. The area indicated by the said change in the picture could be marked and later further investigated by any one of a number of suitable known geophysical prospecting procedures carried out on the surface of the ground in order to arrive at a final conclusion as to the precise meaning of the change observed in the picture.

As hereinbefore set forth, our invention provides for very rapid and precise geophysical exploration from the air or water whereby the operator can determine not only the location but also the approximate length, width, thickness, outline, and depth below the earth's surface of sought for deposits. In the case of exploration of the magnetic type, the operator can simultaneously investigate three magnetic field components at right angles to each other and it is possible for him to carry out magnetic measurements having a sensitivity of one gamma or even less. While our method and apparatus are adapted for use when being transported in any suitable way over the area under examination, we have found, as previously noted, that especially effective exploration may be conducted from airplanes of the helicopter type largely because of their availability for both horizontal and vertical flights at greatly varying speeds.

Claims directed to apparatus for and method of magnetic exploration are not included herein because they are presented in a division of this application, Serial Number 2,885, which was filed January 17, 1948, and the failure to include such claims in this application and the patent to be issued thereon is not to be understood as constituting in any respect an abandonment or partial abandonment of the subject matter thereof.

Where, in the claims, we refer to aircraft, the term is used in its generic sense and is intended to cover craft both lighter than air and heavier than air, nonpropelled or propelled in any manner, and captive or free. Similarly, the term water vessel is intended to include both surface and sub-surface vessels, and all types of flotation devices whether propelled or nonpropelled; while the term "fluid supported craft" is intended to include both air and water craft, and the expression "by fluid suspension" is intended to include both air and water suspension.

We desire it to be understood that various changes may be resorted to in the form, construction, arrangement, and material of our apparatus; in the manner of its mounting and transportation; and in the steps of our method or procedure from beginning to end; without departing from the spirit and scope of our invention; and that we do not intend to be limited to details herein shown or described, except as they are recited in the claims or may be required by disclosures of the prior art.

What we claim is:

1. A method of geophysical exploration which includes the following steps, transporting by fluid suspension along a substantially horizontal profile over an area under investigation an operator and a detecting instrument which is responsive while in motion and stationary to effects of earth anomalies related to mineral deposits in the earth, automatically stabilizing said instrument with respect to both leveling and orientation against motions of the transporting means, automatically making a record of said effects of said anomalies as the instrument responds thereto, positioning the transporting means substantially over the point where the strongest effect of an anomaly is recorded, moving the transporting means substantially horizontally and substantially at right angles to the said profile until the said strongest effect decreases to a selected strength, dropping a marker on the terrain at this point, repeating the next to the last step in substantially the opposite direction, dropping a marker on the terrain at this point, elevating the transporting means, photographing the terrain below the transporting means including the said markers, repeating the transporting, detecting and recording steps along additional profiles between said markers, and geophysically interpreting the cumulative information thus obtained.

2. A method of geophysical exploration which includes the following steps, transporting by fluid suspension along a substantially horizontal profile over an area under investigation an operator and a detecting instrument which is responsive while in motion and stationary to effects of earth anomalies related to mineral deposits in the earth, automatically stabilizing said instrument with respect to both leveling and orientation against motions of the transporting means, automatically making a record of said effects of said anomalies as the instrument responds thereto, positioning the transporting means substantially over the point where the strongest effect of an anomaly is recorded, moving the transporting means substantially horizontally and substantially at right angles to the said profile until the said strongest effect decreases to a selected strength, repeating the last step in substantially the opposite direction, returning the transporting means to substantially the said point of strongest effect, moving the transporting means substantially vertically from said last named point until said effect decreases to a selected strength, and geophysically interpreting the cumulative information thus obtained.

HANS T. F. LUNDBERG.
THEODORE ZUSCHLAG.

References Cited in the file of this patent

UNITED STATES PATENTS

| Number | Name | Date |
|---|---|---|
| 1,585,591 | Lowy | May 18, 1926 |
| 1,812,392 | Zuschlag | June 30, 1931 |
| 1,896,737 | Zuschlag | Feb. 7, 1933 |
| 1,988,521 | Sperry | Jan. 22, 1935 |
| 2,027,393 | McCreary | Jan. 14, 1936 |
| 2,075,808 | Fliess | Apr. 6, 1937 |
| 2,077,707 | Melton | Apr. 20, 1937 |
| 2,114,283 | Anderson | Apr. 19, 1938 |
| 2,246,259 | Machts | June 17, 1941 |
| 2,266,449 | Ullrich et al. | Dec. 16, 1941 |
| 2,366,621 | Hineline | Jan. 2, 1945 |
| 2,406,870 | Vacquier | Sept. 3, 1946 |
| 2,407,663 | Hart | Sept. 17, 1946 |
| 2,424,772 | Rieber | July 29, 1947 |
| 2,468,554 | Hull | Apr. 26, 1949 |

FOREIGN PATENTS

| Number | Country | Date |
|---|---|---|
| 322,040 | Germany | June 19, 1920 |
| 433,450 | Great Britain | Aug. 12, 1935 |

OTHER REFERENCES

"Measurement of Magnetic Fields," A. W. Hull, in "Physical Review," September 1923—pp. 279–292.

"Geophysical Exploration," Heiland, p. 41, published 1940 by Prentice-Hall, New York city.

A. I. M. E. Transactions, 1932, pp. 213–214, discussion by Heiland.

Eng. and Mining Journal, December 1935, pp. 609–610, article by Heiland.

"Geophysics," April 1946, pp. 135–147, article by Logachev.